US012785934B2

(12) United States Patent
Kumar et al.

(10) Patent No.: US 12,785,934 B2
(45) Date of Patent: Nov. 3, 2026

(54) HASH FUNCTION AND ADDRESS BIT SELECTION

(71) Applicant: QUALCOMM Incorporated, San Diego, CA (US)

(72) Inventors: Abhishek Kumar, Bangalore (IN); Adarsh Golikeri, Bengaluru (IN); Hongqiang Wang, San Diego, CA (US); Yu Zhou, San Diego, CA (US); Andrew Evan Gruber, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 19/080,589

(22) Filed: Mar. 14, 2025

(65) Prior Publication Data

US 2026/0280849 A1 Sep. 17, 2026

(51) Int. Cl.
*G06F 21/00* (2013.01)
*H04L 9/06* (2006.01)

(52) U.S. Cl.
CPC .................................. *H04L 9/0643* (2013.01)

(58) Field of Classification Search
CPC ............ H04L 9/0643; G06T 1/60; G06T 1/20
See application file for complete search history.

(56) References Cited

U.S. PATENT DOCUMENTS 7,275,143 B1 * 9/2007 Simeral .................. G06F 21/79 711/5
7,290,116 B1 10/2007 Grohoski et al.
2004/0205056 A1 * 10/2004 Mori .................. G06F 16/9014
2011/0167192 A1 * 7/2011 Iyer ..................... G06F 12/1009 711/E12.058
2016/0085672 A1 * 3/2016 Fenney ............... G06F 12/1408 711/3
2019/0095490 A1 * 3/2019 Colgrove ............ G06F 16/2255
2021/0135685 A1 * 5/2021 Kumar ................ G06F 16/2255
2022/0156734 A1 * 5/2022 Iwato ...................... G06F 12/06
2023/0139212 A1 * 5/2023 Randall ............... G06F 12/0292 711/118
2024/0078180 A1 * 3/2024 Zorn .................. G06F 12/0811
(Continued)

OTHER PUBLICATIONS

International Search Report and Written Opinion—PCT/US2026/016453—ISA/EPO—Jul. 3, 2026.
(Continued)

*Primary Examiner* — William A Corum, Jr.
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for XOR-based hash function and address bit-selection. A graphics processor may determine a selected hash function, of a set of hash functions, having a highest number of value changes during an execution thereof over hashed memory address bits across concurrent fibers for a subgroup of a workgroup during respective executions for the set of hash functions. The hashed memory address bits are associated with accesses to a memory bank of a memory. The graphics processor may execute, in association with the memory bank, the selected hash function for a set of remaining instructions of the workgroup.

20 Claims, 8 Drawing Sheets

(56) References Cited

U.S. PATENT DOCUMENTS

| | | | | |
|---|---|---|---|---|
| 2025/0103512 | A1* | 3/2025 | Unterluggauer | G06F 12/0808 |
| 2026/0148331 | A1* | 5/2026 | Durbhakula | G06T 1/60 |

OTHER PUBLICATIONS

Liu Y., et al., "Get out of the valley: Power-Efficient Address Mapping for GPUs", 2018 ACM/IEEE 45th Annual International Symposium on Computer Architecture, Computer Architecture IEEE Press, 445 Hoes Lane, Po Box 1331, Piscataway, NJ08855-1331USA, Jun. 2, 2018, pp. 166-179, XP058416336.

Zhang J., et al., "Software-Defined Address Mapping: a case on 3D memory", 2021 The 9th International Conference on Information Technology: IOT and Smart City ACMPUB27, New York, NY, USA, Feb. 28, 2022, pp. 70-83, XP058857348.

* cited by examiner

HASH FUNCTION AND ADDRESS BIT SELECTION

TECHNICAL FIELD

The present disclosure relates generally to processing systems, and more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques for graphics processing may hash functions based on exclusive OR (XOR) techniques to hash memory address bits for minimizations of address conflicts, but may not address the efficacy of an XOR-based hash function or of fixed address bit mapping across a number of different workloads. There is a need for improved techniques for the application of XOR-based hash functions and address bit mappings to account for address conflicts over varied workloads.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus includes a memory; and a processor coupled to the memory and, based on information stored in the memory, the processor is configured to: determine a selected hash function, of a set of hash functions, having a highest number of value changes during an execution thereof over hashed memory address bits across concurrent fibers for a subgroup of a workgroup during respective executions for the set of hash functions, where the hashed memory address bits are associated with accesses to a memory bank of a memory; and to execute, in association with the memory bank, the selected hash function for a set of remaining instructions of the workgroup.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
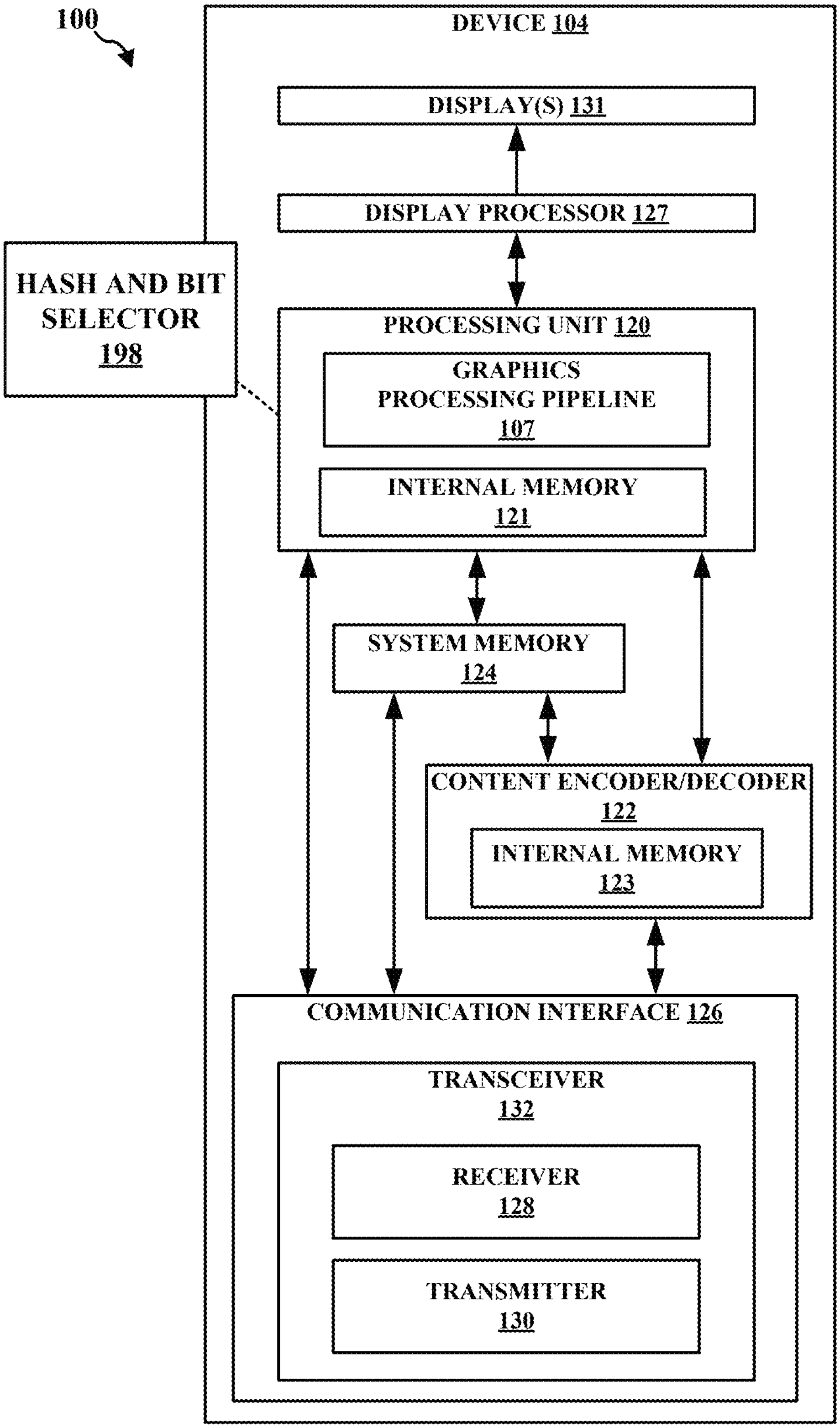
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit. As used herein, instances of the terms "value changes" and "bit flips" in the context of hashed address bits may refer to changes between the values of zero '0' and one '1' for a given bit. As used herein, instances of the term "entropy" may refer to a count of value changes/bit flips. As used herein, instances of the terms "fiber" or "fibers" may refer to a thread or threads that may execute instructions concurrently for a shader processor. As used herein, instances of the term "workgroup" may refer to a collection of graphics processor fibers or threads executing for a given shader processor of a set of shader processors, where more than one workgroup may be executed on a given shader processor. As used herein, instances of the terms "wave" or "subgroup" may refer to a smallest executing portion/unit of a workgroup that is associated with a number of fibers/threads that can execute concurrently and/or in lockstep. As used herein, the terms "bank" and "memory bank" may refer to a segment of a memory associated with specific data and by which concurrent accesses may be enabled for a workgroup/subgroup. As used herein, instances of the term "bit location" may refer to the placing/significance of an address bit within a memory address and/or to the address bit itself. As used herein, instances of the terms "map" or "mapping" may refer to a unique designation for memory banks of a memory by which each memory bank may be referenced based on a unique possible value of $2^k$, where k is an integer number of bits such that $2^k$ equals the number of memory banks to be mapped.

Address bank conflicts (also "bank conflicts," generally) may severely reduce the bandwidth of an interleaved multibank memory (e.g., a local memory, a global memory backed by multi-level caches, etc.). Bank conflicts may also significantly increase the memory latency of workloads that are memory bound. XOR-based hash functions, which compute each bank row (or set) index bit as an XOR of a subset of the bits in the address, may be utilized in certain cases to reduce or minimize bank conflicts. However, when implementing such schemes for local memory, some example schemes commonly pick a specific XOR-based hash function at the start of workload execution and use this specific XOR-based hash function to hash addresses to memory banks and rows. Yet, there may not be one single XOR-based hash function that would be optimal across different workgroups of a given workload. For example, each workgroup may have its own separate partition of local memory and multiple workgroups may execute concurrently on a shader processor of a graphics processor (e.g., a GPU). Additionally, once the XOR-based hash has been applied, determinations for mapping of address bits to banks are made (e.g., a determination for which bits, such as 3 bits, from the address will be mapped to memory banks, such as to 8 banks). Yet again, issues arise for selecting which exact bits to utilize for mapping (e.g., address bit selection may also be fixed across different workgroups of the workload beforehand). Further, re-hashing for each instruction of a workgroup or a workload (e.g., after every load/store instruction) is computationally intensive, increases latency, and may cause conflicts of hashed addresses based on producer-consumer dependency. Thus, sub-optimal reductions in local memory bank conflicts may be realized due to the issues noted above.

Aspects herein provide for optimized XOR-based hash function and bit selection for memory mapping. Aspects provide for XOR-based hash functions to hash addresses to memory banks and rows to reduce bank conflicts. Aspects provide for a generalized approach for selecting, at the first load/store instruction of a workload and after every N load/store instructions, a combination of an XOR-based hash function and the address bit selection which results in a minimal number of bank conflicts. The algorithm learns the memory access pattern from the hashed address which is associated with the highest entropy (e.g., based on bit-flips/value changes of hashed address bits). Aspects provide for selecting a combination of an XOR-based hash function and an address bit(s) selection that results in a minimal number of local memory bank conflicts for an optimal XOR-based hash function and address bit-selection scheme for local memory (although aspects also include other types of memory for which aspects are applicable as would be understood by a person of skill in the relevant art(s)). Aspects enable distribution patterns into different rows/sets of memory based on the principle of entropy maximization (e.g., based on an algorithm that learns local memory access patterns from hashed addresses. For example, aspects provide for accurately modeling local memory based on characterizing local memory usage and access patters across multiple workloads for metrics such as, but not limited to, bank conflicts, numbers of coalesced and non-coalesced requests, average coalescing throughput (e.g., bytes per cycle, fibers per cycle, etc.), and/or the like.

The examples describe herein may refer to a use and functionality of a graphics processing unit (GPU). As used herein, a GPU can be any type of graphics processor, and a graphics processor can be any type of processor that is designed or configured to process graphics content. For example, a graphics processor or GPU can be a specialized electronic circuit that is designed for processing graphics content. As an additional example, a graphics processor or GPU can be a general purpose processor that is configured to process graphics content.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, a GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a hash and bit selector 198 configured to determine a first hash function, of a set of hash functions, having a first number of value changes over hashed memory address bits across concurrent fibers for a subgroup of a workgroup, where the first number of value changes for the first hash function is a highest number of value changes compared to remaining hash functions in the set of hash functions during respective executions for the set of hash functions, where the hashed memory address bits are associated with accesses to a memory bank of a memory; and to execute, in association with the memory bank, the first hash function for a set of remaining instructions of the workgroup. The hash and bit selector 198 may also be configured to execute, prior to determination of the first hash function and as the respective executions, each hash function of the set of hash functions for an initial instruction of the workgroup for a first access to the memory bank of the accesses to the memory bank; and to determine a respective number of value changes over the hashed memory address bits across the concurrent fibers for the subgroup, where the initial instruction includes the first access to the memory bank. The hash and bit selector 198 may also be configured to determine, prior to determination of the first hash function, a memory address bit of the hashed memory address bits having a different highest number of value changes for the memory address bit across the concurrent fibers for the subgroup during the respective executions; where to execute the first hash function, the hash and bit selector 198 may be configured to execute the first hash function in association with the memory address bit. The hash and bit selector 198 may also be configured to store a bit location associated with the memory address bit for a set of memory address bits based on the memory address bit having the different highest number of value changes. The hash and bit selector 198 may also be configured to map, prior to execution of the first hash function for the set of remaining instructions of the workgroup, a set of memory address bits having an indication of a highest entropy to the memory bank, where the set of memory address bits includes the memory address bit based on the memory address bit having the different highest number of value changes, where to execute the first hash function, the hash and bit selector 198 may be configured to execute the first hash function in association with the mapped set of memory address bits. The hash and bit selector 198 may also be configured to determine, subsequent to determination of the first hash function and prior to the mapping of the set of memory address bits, a set of additional memory address bits of the hashed memory address bits having respective next highest numbers of value changes for memory address bits thereof across the concurrent fibers for the subgroup during execution of the first hash function for the initial instruction, where the set of memory address bits includes the set of additional memory address bits based on the set of additional memory address bits having the respective next highest numbers of value changes. The hash and bit selector 198 may also be configured to output an indication of execution of the first hash function for the set of remaining instructions of the workgroup. Although the following description may be focused on graphics processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit or bits that indicate which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
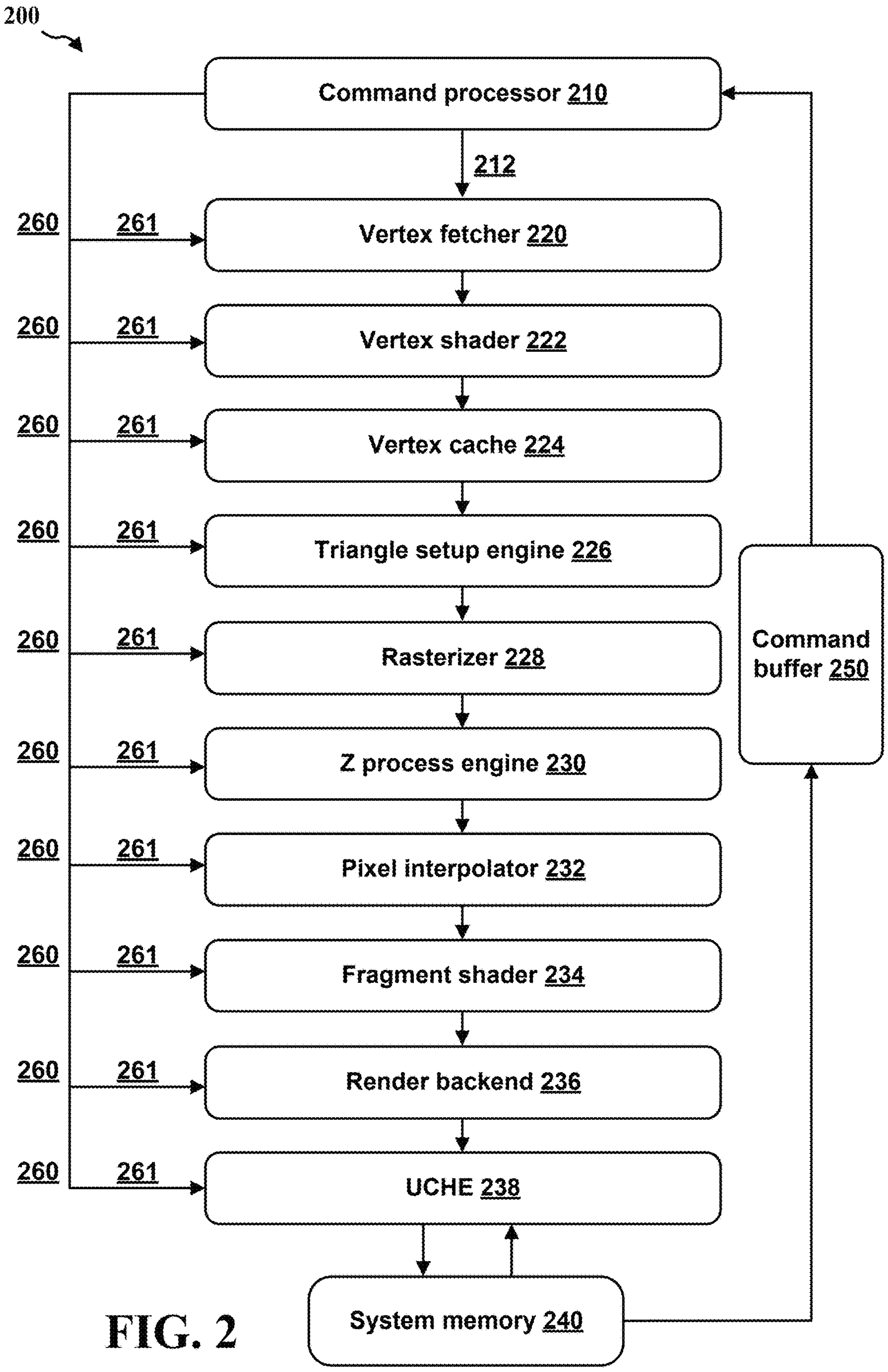
FIG. 2 illustrates an example graphics processor (e.g., a graphics processing unit (GPU)) in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can simultaneously store the following information: context register of context N, draw call(s) of context N, context register of context N+1, and draw call(s) of context N+1.

GPUs can render images in a variety of different ways. In some instances, GPUs can render an image using direct rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects of tiled rendering, during a binning pass, an image can be divided into different bins or tiles. In some aspects, during the binning pass, a visibility stream can be constructed where visible primitives or draw calls can be identified. A rendering pass may be performed after the binning pass. In contrast to tiled rendering, direct rendering does not divide the frame into smaller bins or tiles. Rather, in direct rendering, the entire frame is rendered at a single time (i.e., without a binning pass). Additionally, some types of GPUs can allow for both tiled rendering and direct rendering (e.g., flex rendering).

In some aspects, GPUs can apply the drawing or rendering process to different bins or tiles. For instance, a GPU can render to one bin, and perform all the draws for the primitives or pixels in the bin. During the process of rendering to a bin, the render targets can be located in GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible so that the non-visible primitives are not rendered, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a binning, a visibility or bin-visibility pass and a rendering or bin-rendering pass.

During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory and used to remove primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
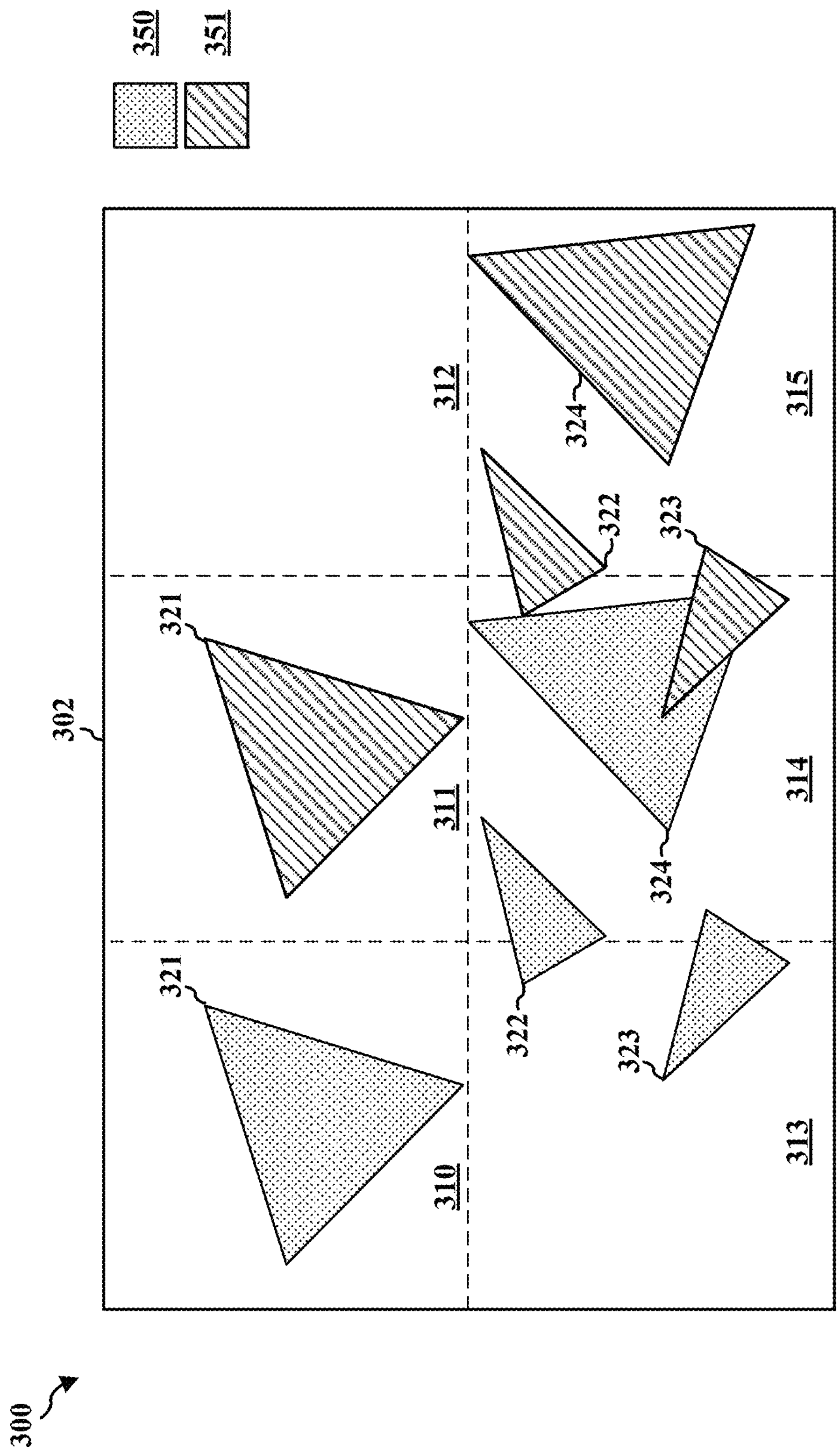
FIG. 3 illustrates an example image or surface in accordance with one or more techniques of this disclosure.

FIG. 3 illustrates image or surface 300, including multiple primitives divided into multiple bins in accordance with one or more techniques of this disclosure. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processors can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, where, as discussed above, a surface is divided into multiple bins or tiles and then each bin or tile can be separately rendered. Further, in tiled rendering, the frame buffer can be partitioned into multiple bins or tiles.

As indicated herein, in some aspects, such as in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GMEM at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In some aspects, such as in bin or tiled rendering, a small portion of the memory can be stored at the GPU, e.g., at the GMEM. In some instances, storing data at the GMEM may utilize a larger processing workload and/or consume more power compared to storing data at the frame buffer or system memory.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some aspects of display processing may utilize different types of mask layers, e.g., a shape mask layer. A mask layer is a layer that may represent a portion of a display or display panel. For instance, an area of a mask layer may correspond to an area of a display, but the entire mask layer may depict a portion of the content that is actually displayed at the display or panel. For example, a mask layer may include a top portion and a bottom portion of a display area, but the middle portion of the mask layer may be empty. In some examples, there may be multiple mask layers to represent different portions of a display area. Also, for certain portions of a display area, the content of different mask layers may overlap with one another. Accordingly, a mask layer may represent a portion of a display area that may or may not overlap with other mask layers.

Figure 4:
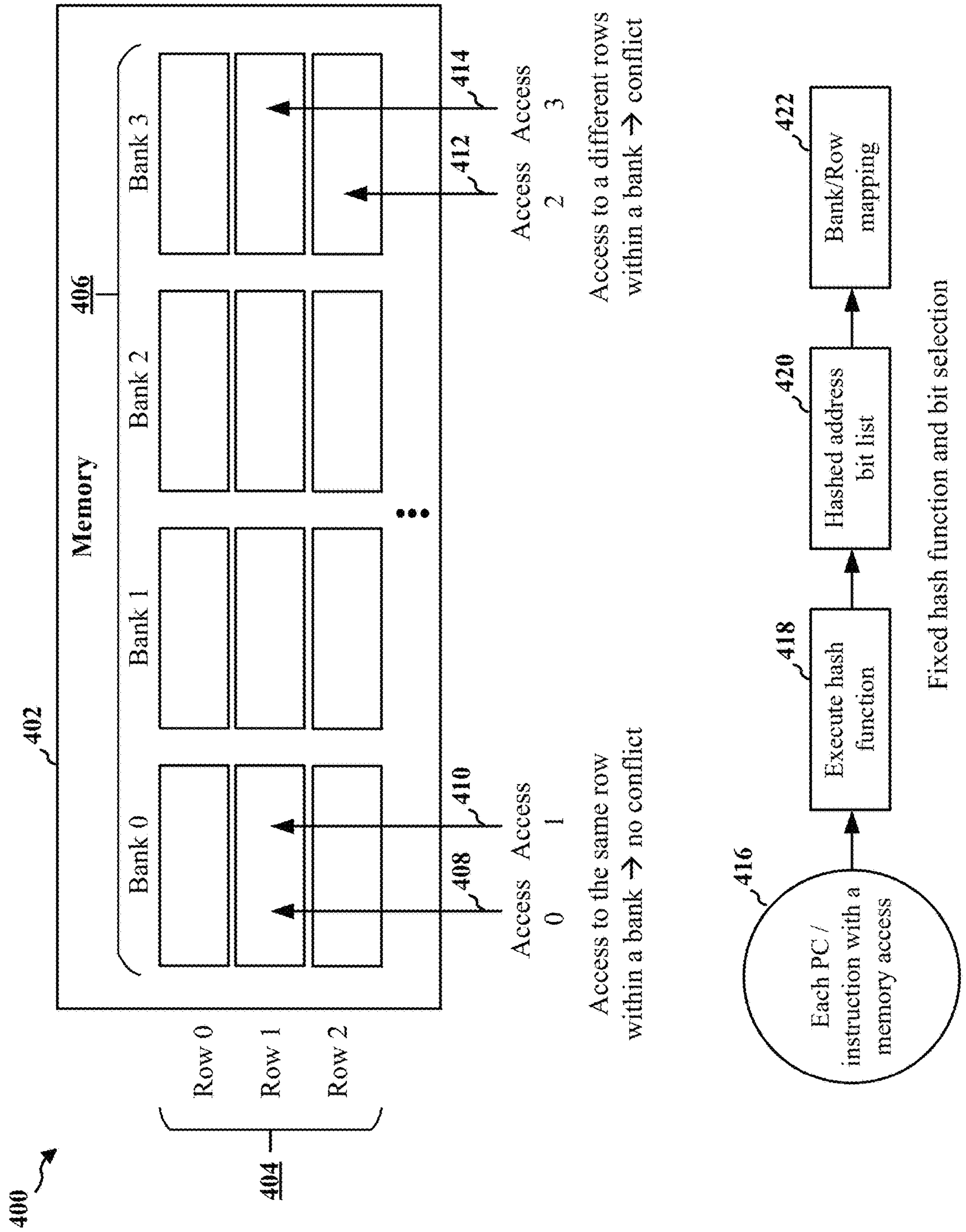
FIG. 4 illustrates a diagram for an example of a memory and memory bank conflicts in accordance with one or more techniques of this disclosure.

FIG. 4 illustrates a diagram 400 for an example of a memory and memory bank conflicts in accordance with one or more techniques of this disclosure. Diagram 400 is described in the context of a fixed hash function and memory address bit selection for a memory 402 (e.g., a local memory for a graphics processor such as a CPU/GPU).

As shown, the memory 402 may include a set of rows 404 and banks 406 that may be accessed by a workload/workgroup. In some cases, conditions in which accesses are made for instructions of a workload/workgroup, e.g., load/store instructions, memory bank conflicts may occur. For instance, an access 408 that takes place concurrently with an access 410 to a same row of the rows 404 in a bank of the banks 406 may not lead to a conflict. In contrast, an access 412 that takes place concurrently with an access 414 to different rows of the rows 404 in a bank of the banks 406 may lead to a conflict.

As noted herein, a fixed hash function and memory address bit selection may lead to bank conflicts, such as shown for the access 412 and the access 414. Such example hashing schemes may provide, for each program counter (PC)/instruction 416 with an access to the memory 402, to be executed (at 418) by the single hash function to generate a hashed address bit list 420. Based on the hashed address bit list 420, fixed bits are utilized for bank/row mapping (at 422) of the memory 402.

Aspects herein, including aspects described below with reference to FIGS. 5, 6, 7, 8, provide optimized XOR-based hash function and bit selection for memory mapping that minimizes/reduces such bank conflicts.

Figure 5:
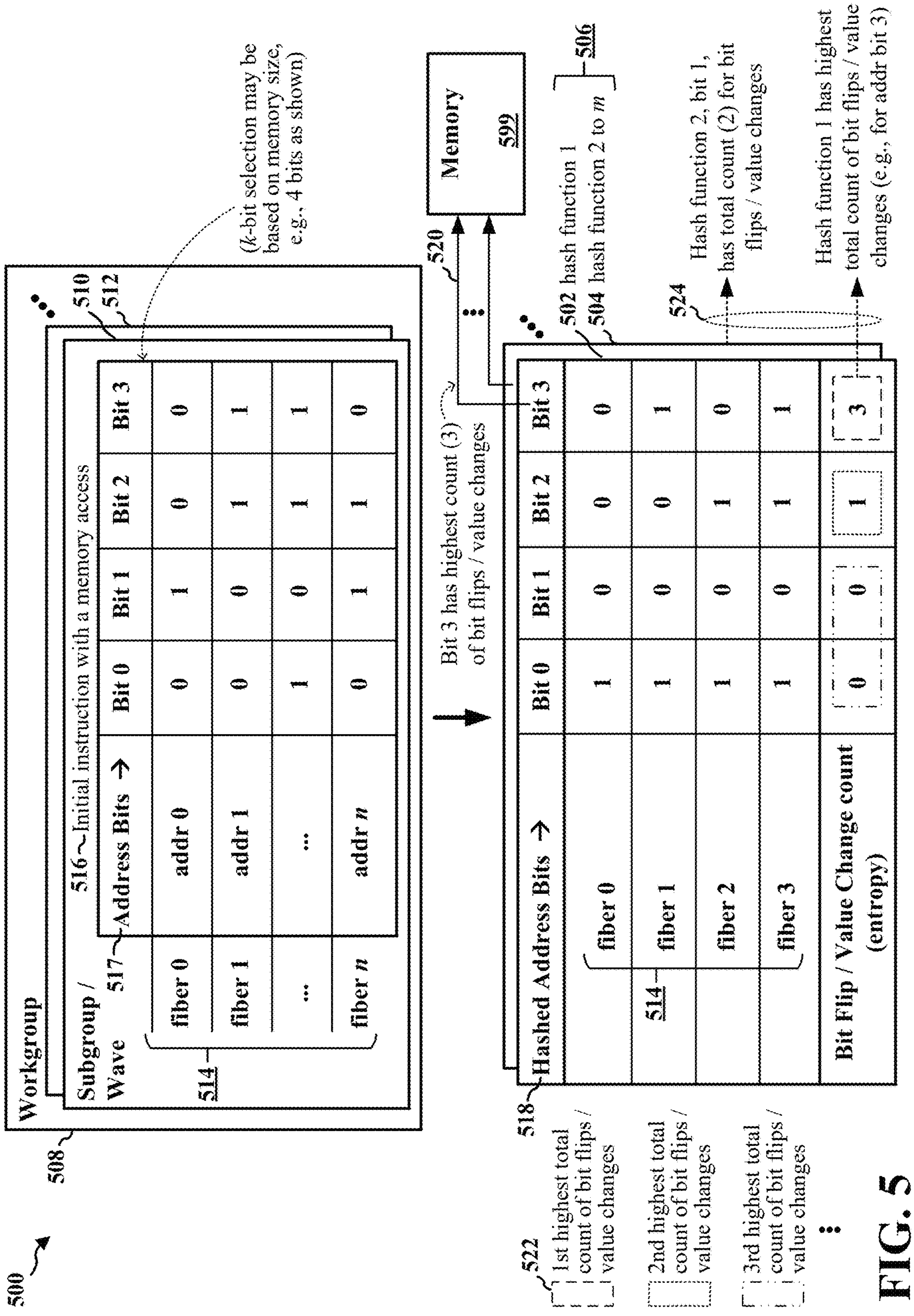
FIG. 5 illustrates optimized XOR-based hash function and bit selection for memory mapping in accordance with one or more techniques of this disclosure.

FIG. 5 illustrates a diagram 500 for optimized XOR-based hash function and bit selection for memory mapping in accordance with one or more techniques of this disclosure. Diagram 500 shows a set of hash functions 506 that includes a first hash function 502 and one or more additional hash functions 504 that may be executed over a first/initial instruction 516 with an access to a memory 599 (e.g., a local memory) for a workgroup 508 and/or for subgroups (or "waves") included in the workgroup 508, e.g., a subgroup 510, a subgroup 512, etc. A graphics processor of a device may execute a set of fibers 514 (e.g., fiber 0, fiber 1, . . . , fiber n) concurrently for instructions of a given subgroup, such as the subgroup 510.

In aspects, for each of the set of fibers 514, each of the set of hash functions 506 may be executed for the first/initial instruction 516 of the subgroup 510 that has an access to the memory 599. In some aspects, a first/initial instruction, e.g., the first/initial instruction 516, may be obtained from a system memory. As one example, at the start of execution of the workgroup 508, the fiber access addresses may be determined for the first/initial instruction 516, which involves memory access to the memory 599, being executed from a PC within a wave/subgroup (e.g., the subgroup 510). For each hash function (e.g., selected from a list of predefined hash functions, such as the set of hash functions 506), the following process may be performed.

The hash function of the set of hash functions 506 may be applied to the addresses from all fibers of the set of fibers 514 in this wave/the subgroup 510. For instance, in a first iteration for the subgroup 510, address 0 for fiber 0, address 1 for fiber 1, . . . , to address n for fiber n, may each have the hash function 502 applied to generate hashed address bits 518 (e.g., shown as four fibers and four address bits, by way of example, while aspects include other numbers of fibers and address bits). The graphics processor may be configured to store (at 520), in the memory 599), the bit location of the address bit with the highest bit-flip count 522 (e.g., the hash address bit 3 in this example: transitions from 0 to 1, then from 1 back to 0, then again from 0 to 1 over the set of fibers 514 and has an entropy value of 3). A next iteration is then performed for a next hash function of the set of hash functions 506, e.g., the hash functions 504, and iterations may be performed for each hash function of the set of hash functions 506.

Next, the hash function, of the set of hash functions 506, which gives the overall highest bit-flip count (e.g., the highest entropy) is determined/selected (at 524). In the illustrated example, the hash function 502 may be selected based on having a highest total count of value changes/bit flips (e.g., 3), as the hash functions 504 may have a lower total count of value changes/bit flips (e.g., 2), for the memory bits with locations stored (at 520). For this determined/selected hash function (e.g., the hash function 502), the remaining address bits, e.g., for a top-k selection of address bits that includes bit 3, are determined/selected based on descending order of their respective bit-flip counts (e.g., a next highest number of value changes) for use as a set of memory address bits. In the illustrated example, bit 1 has a highest bit-flip count of 3, bit 2 has a next highest bit-flip count '1', followed by bits 0 and 1. In aspects, the value of k may be an integer greater than or equal to two '3', and may be based on the size of the memory 599 (e.g., the number of address bits for a memory address), the hash function(s) (e.g., the set of hash functions 506), and/or the like.

Based on the selected hash function and the selected address bits, e.g., a set of memory address bits, the graphics processor may be configured to determine the memory bank mapping, and to utilize the selected bank mapping for the remainder of the workgroup 508 operations in associated with the memory 599.

Figure 6:
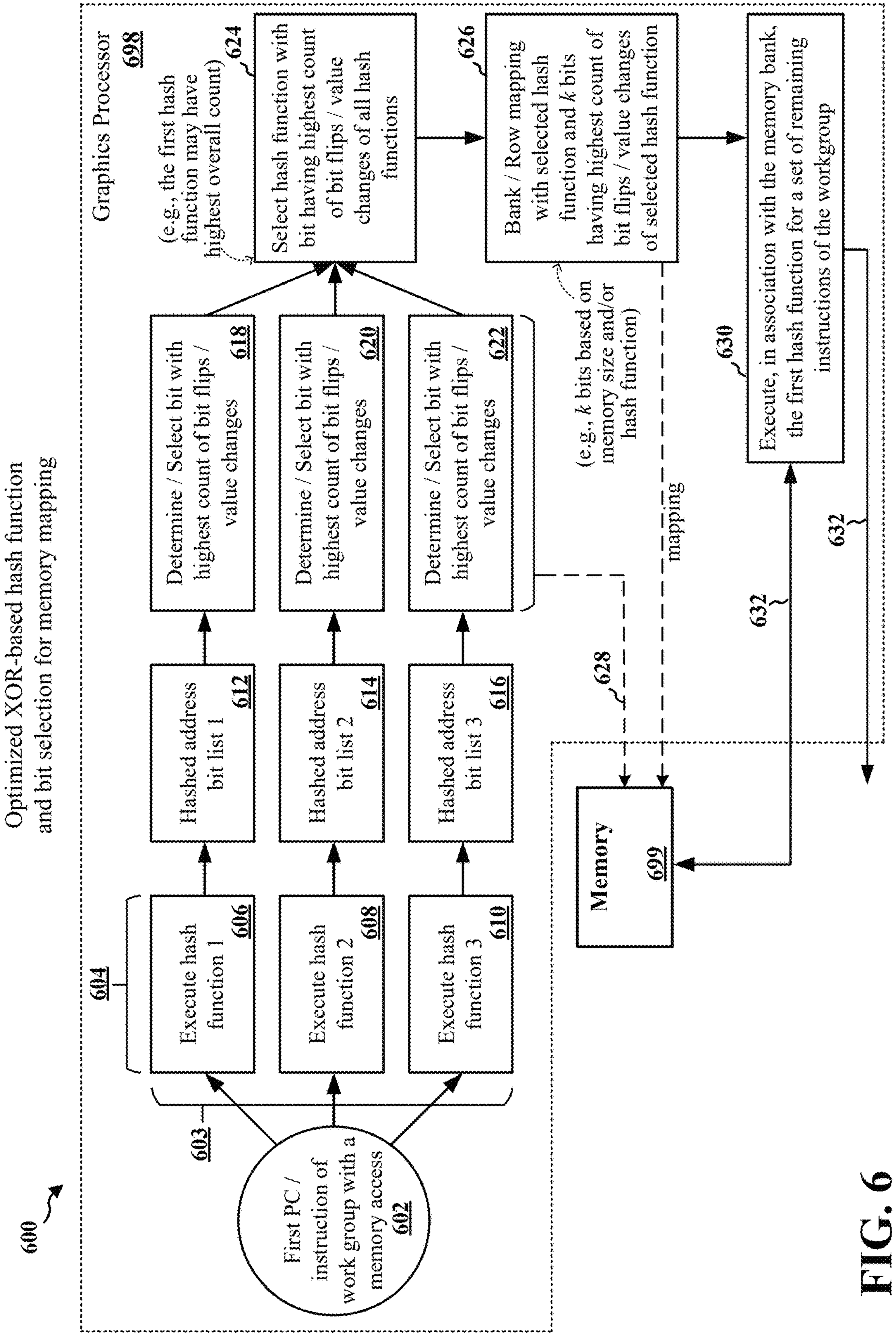
FIG. 6 illustrates optimized XOR-based hash function and bit selection for memory mapping in accordance with one or more techniques of this disclosure.

FIG. 6 illustrates a diagram 600 for optimized XOR-based hash function and bit selection for memory mapping in accordance with one or more techniques of this disclosure. Diagram 600 may be an aspect of diagram 500 in FIG. 5, and may be performed by a graphics processor 698 in conjunction with a memory 699 (e.g., a local memory).

As noted above, aspects for example hashing schemes associated with optimized XOR-based hash function and bit selection for memory mapping may provide for a first/initial program counter (PC)/instruction 602, across concurrent fibers 603 to be executed for a workgroup or subgroup/wave, with an access to the memory 699, to be executed at the graphics processor 698 by each hash function of a set of hash functions 604 at the start of a workgroup or subgroup/wave. For example, the set of hash functions 604 may include two or more hash functions. In the illustrated example, the set of hash functions 604 may include three different hash functions. A first hash function may be executed (at 606, graphics processor 698) against the first/initial PC/instruction 602 to generate a first hashed address bit list 612, a second hash function may be executed (at 608, graphics processor 698) against the first/initial PC/instruction 602 to generate a second hashed address bit list 614, and a third hash function may be executed (at 610, graphics processor 698) against the first/initial PC/instruction 602 to generate a third hashed address bit list 616.

Based on the first hashed address bit list 612, the graphics processor 698 may be configured to determine/select (at 618) a bit therefrom having a highest count of bit flips/value changes for the first hash function, based on the second hashed address bit list 614, the graphics processor 698 may be configured to determine/select (at 620) a bit therefrom having a highest count of bit flips/value changes for the second hash function, and on the third hashed address bit list 616, the graphics processor 698 may be configured to determine/select (at 622) a bit therefrom having a highest count of bit flips/value changes for the third hash function. The address bit locations for the determined/selected bits (at 618, at 620, at 622) may be stored (at 628) in the memory 699.

Figure 7:
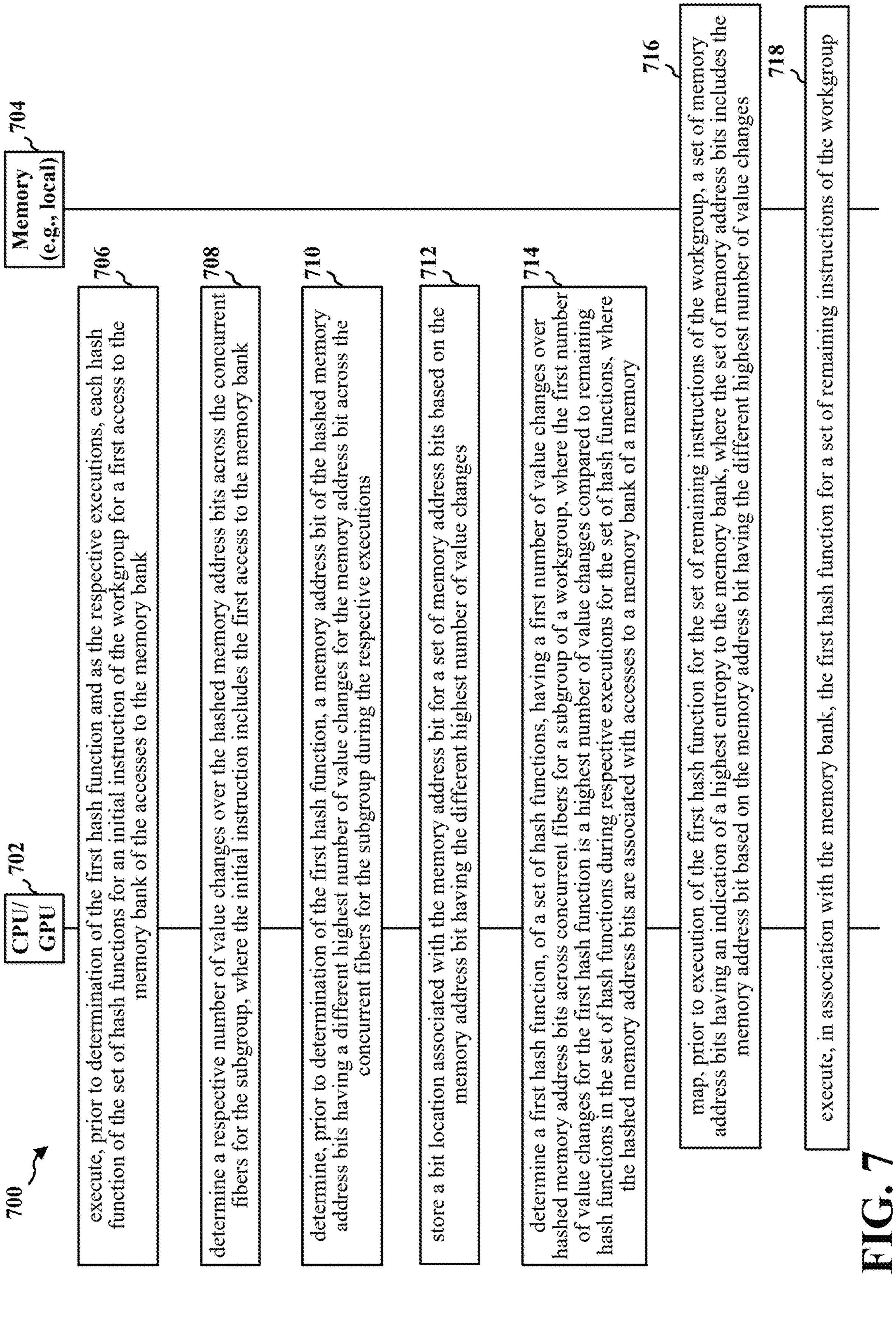
FIG. 7 is a call flow diagram illustrating example communications between a processing unit and a memory in accordance with one or more techniques of this disclosure.

The graphics processor 698 may be configured to determine/select (at 624) a hash function of the set of hash functions 604 having the highest count of bit flips/value changes based on the address bit locations for the determined/selected bits (at 618, at 620, at 622) in the memory 699. In the illustrated example, the first hash function of the set of hash functions 604 may have highest overall count (e.g., the highest entropy). The graphics processor 698 may be configured to map (at 626) memory banks/rows of the memory 699 based on the determined/selected (at 624) hash function and a number k of bits from the hashed address bit list associated with the hash function determined/selected (at 624). In aspects, the k bits from the hashed address bit list may include the bit with the highest count of bit flips/value changes, for the determined/selected hash function, that was stored (at 628) in the memory 699. The number 'k' may be based on a size of the memory 699, the hash function determined/selected, the set of hash functions 604, and/or the like. The graphics processor 698 may be configured to execute (at 630), in association with the memory bank of the memory 699, the first hash function for a set of remaining instructions of the workgroup. The graphics processor 698 may be configured to output (e.g., store/provide/transmit) an indication 632 of the hash function determined/selected (at 624) (e.g., the first hash function of the set of hash functions 604) to a system memory, the memory 699, and/or the like FIG. 7 is a call flow diagram 700 for illustrating example communications between a graphics processor 702 and a memory 704 in accordance with one or more techniques of this disclosure. In aspects, call flow diagram 700 is described for optimized XOR-based hash function and bit selection for memory mapping, e.g., of a local memory. In an example, the graphics processor 702 may be or include the processing unit 120/the hash and bit selector 198. In some aspects, the graphics processor 702 may be a CPU or a GPU, and the memory 704 may include a local memory of the graphics processor 702, e.g., of a GPU. In aspects, the graphics processor 702 comprises a wireless communication device that is configured to perform the call flow diagram 700.

At 706, the graphics processor 702 may be configured to execute, prior to determination of the first hash function and as the respective executions, each hash function of the set of hash functions for an initial instruction of the workgroup for a first access to the memory bank (e.g., of the memory 704) of the accesses to the memory bank. In aspects, each hash function of the set of hash functions may be an XOR-based hash function.

At 708, the graphics processor 702 may be configured to determine a respective number of value changes over the hashed memory address bits across the concurrent fibers for the subgroup, where the initial instruction includes the first access to the memory bank (e.g., of the memory 704).

At 710, the graphics processor 702 may be configured to determine prior to determination of the first hash function, a memory address bit of the hashed memory address bits having a different highest number of value changes for the memory address bit across the concurrent fibers for the subgroup during the respective executions. In aspects, the graphics processor 702 may be configured to determine, subsequent to determination of the first hash function and prior to the mapping of the set of memory address bits, a set of additional memory address bits of the hashed memory address bits having respective next highest numbers of value changes for memory address bits thereof across the concurrent fibers for the subgroup during execution of the first hash function for the initial instruction. In some aspects, a number of memory address bits in the set of memory address bits may be based on at least one of a size of the memory 704 or the set of hash functions.

At 712, the graphics processor 702 may be configured to store a bit location associated with the memory address bit for a set of memory address bits based on the memory address bit having the different highest number of value changes.

At 714, the graphics processor 702 may be configured to determine a first hash function, of a set of hash functions, having a first number of value changes over hashed memory address bits across concurrent fibers for a subgroup of a workgroup, where the first number of value changes for the first hash function is a highest number of value changes compared to remaining hash functions in the set of hash functions during respective executions for the set of hash functions, where the hashed memory address bits are associated with accesses to a memory bank of the memory 704. In some aspects, the graphics processor 702 may be configured to determine, subsequent to determination of the first hash function and prior to the mapping of the set of memory address bits, a set of additional memory address bits of the hashed memory address bits having respective next highest numbers of value changes for memory address bits thereof across the concurrent fibers for the subgroup during execution of the first hash function for the initial instruction. In aspects, to determine the first hash function, the graphics processor 702 may be configured to select the first hash function out of the set of hash functions based on the first number of value changes for the first hash function being the highest number of value changes compared to the remaining hash functions during the respective executions for the set of hash functions.

At 716, the graphics processor 702 may be configured to map, prior to execution of the first hash function for the set of remaining instructions of the workgroup, a set of memory address bits having an indication of a highest entropy to the memory bank (e.g., of the memory 704), where the set of memory address bits includes the memory address bit based on the memory address bit having the different highest number of value changes. In aspects, the indication of the highest entropy may be associated with the highest number of value changes (e.g., bit flips) for the set of memory address bits across the concurrent fibers.

At 718, the graphics processor 702 may be configured to execute, in association with the memory bank (e.g., of the memory 704), the first hash function for a set of remaining instructions of the workgroup. The graphics processor 702 may be configured to execute the first hash function in association with the memory address bit (e.g., determined at 710). The graphics processor 702 may be configured to execute the first hash function in association with the mapped set of memory address bits. In aspects, the graphics processor 702 may be configured to output an indication of execution of the first hash function for the set of remaining instructions of the workgroup. In some aspects, to output the indication of the execution of the first hash function for the set of remaining instructions of the workgroup, the graphics processor 702 may be configured to transmit the indication of the execution of the first hash function for the set of remaining instructions of the workgroup. In some aspects, to output the indication of the execution of the first hash function for the set of remaining instructions of the workgroup, the graphics processor 702 may be configured to store the indication of the execution of the first hash function for the set of remaining instructions of the workgroup. The indication may be stored in a system memory, in the memory 704, and/or the like.

Figure 8:
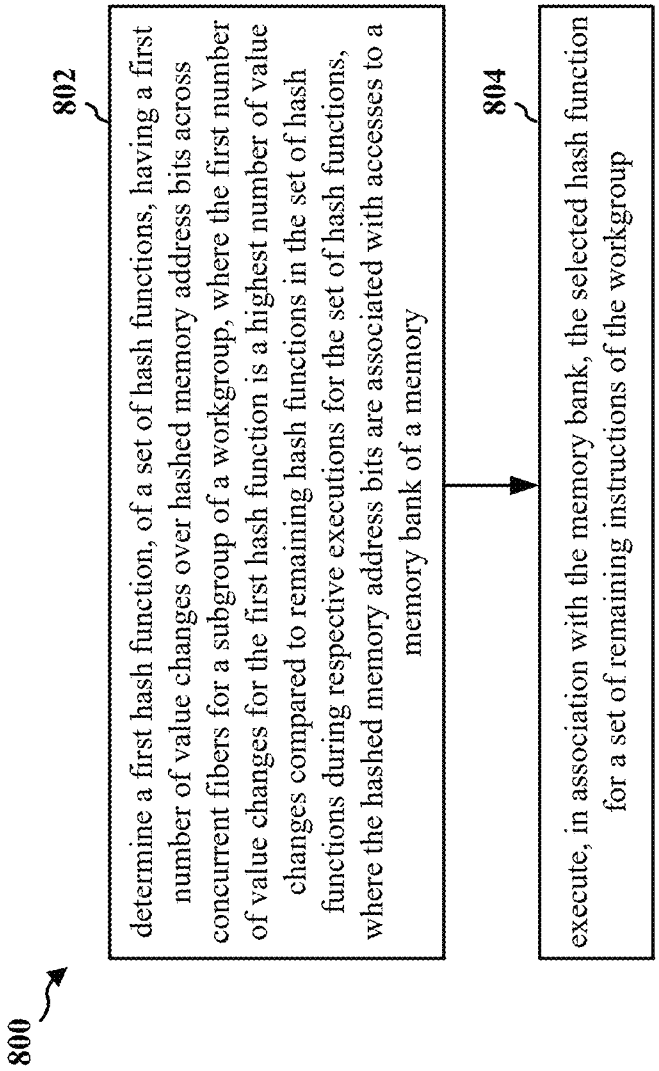
FIG. 8 is a flowchart of an example method of graphics processing in accordance with one or more techniques of this disclosure.

FIG. 8 is a flowchart 800 of an example method of graphics processing in accordance with one or more techniques of this disclosure. The method may be performed by an apparatus, such as an apparatus for graphics processing, a GPU, a CPU, a wireless communication device, and the like, as used in connection with the aspects of FIGS. 1-7.

At 802, the apparatus may determine a first hash function, of a set of hash functions, having a first number of value changes over hashed memory address bits across concurrent fibers for a subgroup of a workgroup, where the first number of value changes for the first hash function is a highest number of value changes compared to remaining hash functions in the set of hash functions during respective executions for the set of hash functions, where the hashed memory address bits are associated with accesses to a memory bank of a memory. For example, referring to FIG. 7, at 714, the graphics processor 702 may be configured to determine a first hash function (e.g., 502 in FIG. 5; 604 in FIG. 6), of a set of hash functions (e.g., 506 in FIG. 5; 604 in FIG. 6), having a first number of value changes (e.g., 522, for 524 in FIG. 5; from 618, from 620, from 622 in FIG. 6) over hashed memory address bits (e.g., 518 in FIG. 5; 612, 614, 616 in FIG. 6) across concurrent fibers (e.g., 514 in FIG. 5; 603 in FIG. 6) for a subgroup (e.g., 510, 512 in FIG. 5; 699 in FIG. 6) of a workgroup (e.g., 508 in FIG. 5), where the first number of value changes (e.g., 522, for 524 in FIG. 5; from 618, from 620, from 622 in FIG. 6) for the first hash function (e.g., 502 in FIG. 5; 606 in FIG. 6) is a highest number of value changes (e.g., 522, for 524 in FIG. 5; from 618, from 620, from 622 in FIG. 6) compared to remaining hash functions (e.g., 504 in FIG. 5) in the set of hash functions (e.g., 506 in FIG. 5; 604 in FIG. 6) during respective executions (e.g., at 606, at 608, at 610 in FIG. 6) for the set of hash functions (e.g., 506 in FIG. 5; 604 in FIG. 6), where the hashed memory address bits (e.g., 518 in FIG. 5; 612, 614, 616 in FIG. 6) are associated with accesses to a memory bank of the memory 704 (e.g., 599 in FIG. 5; 699 in FIG. 6). In an example, at 706, the graphics processor 702 may be configured to execute, prior to determination of the first hash function (e.g., 502 in FIG. 5; 606 in FIG. 6) and as the respective executions (e.g., at 606, at 608, at 610 in FIG. 6), each hash function (e.g., 502, 504 in FIG. 5; 606, 608, 610 in FIG. 6) of the set of hash functions (e.g., 506 in FIG. 5; 604 in FIG. 6) for an initial instruction (e.g., 516 in FIG. 5; 602 in FIG. 6) of the workgroup (e.g., 508 in FIG. 5) for a first access to the memory bank (e.g., of the memory 704 (e.g., 599 in FIG. 5; 699 in FIG. 6)) of the accesses to the memory bank. In aspects, each hash function (e.g., 502, 504 in FIG. 5; 606, 608, 610 in FIG. 6) of the set of hash functions (e.g., 506 in FIG. 5; 604 in FIG. 6) may be an XOR-based hash function. At 708, the graphics processor 702 may be configured to determine (e.g., at 524 in FIG. 5; at 618, at 620, at 622 in FIG. 6) a respective number of value changes (e.g., 522, for 524 in FIG. 5; from 618, from 620, from 622 in FIG. 6) over the hashed memory address bits (e.g., 518 in FIG. 5; 612, 614, 616 in FIG. 6) across the concurrent fibers (e.g., 514 in FIG. 5; 603 in FIG. 6) for the subgroup (e.g., 510, 512 in FIG. 5; 699 in FIG. 6), where the initial instruction (e.g., 516 in FIG. 5; 602 in FIG. 6) includes the first access to the memory bank (e.g., of the memory 704 (e.g., 599 in FIG. 5; 699 in FIG. 6)). At 710, the graphics processor 702 may be configured to determine (e.g., at 524 in FIG. 5; at 618, at 620, at 622 in FIG. 6) prior to determination of the first hash function (e.g., 502 in FIG. 5; 606 in FIG. 6), a memory address bit of the hashed memory address bits (e.g., 518 in FIG. 5; 612, 614, 616 in FIG. 6) having a different highest number of value changes (e.g., 522, for 524 in FIG. 5; from 618, from 620, from 622 in FIG. 6) for the memory address bit across the concurrent fibers (e.g., 514 in FIG. 5; 603 in FIG. 6) for the subgroup (e.g., 510, 512 in FIG. 5; 699 in FIG. 6) during the respective executions (e.g., at 606, at 608, at 610 in FIG. 6). In aspects, the graphics processor 702 may be configured to determine (e.g., at 524 in FIG. 5; at 618, at 620, at 622 in FIG. 6), subsequent to determination of the first hash function (e.g., 502 in FIG. 5; 606 in FIG. 6) and prior to the mapping (e.g., at 626 in FIG. 6) of the set of memory address bits (e.g., k bits, mapping in FIG. 6), a set of additional memory address bits of the hashed memory address bits (e.g., 518 in FIG. 5; 612, 614, 616 in FIG. 6) having respective next highest numbers of value changes (e.g., 522, for 524 in FIG. 5; from 618, from 620, from 622 in FIG. 6) for memory address bits thereof across the concurrent fibers (e.g., 514 in FIG. 5; 603 in FIG. 6) for the subgroup (e.g., 510, 512 in FIG. 5; 699 in FIG. 6) during execution of the first hash function (e.g., at 606 in FIG. 6) for the initial instruction (e.g., 516 in FIG. 5; 602 in FIG. 6). In some aspects, a number of memory address bits in the set of memory address bits (e.g., k bits, mapping in FIG. 6) may be based on at least one of a size of the memory 704 (e.g., 599 in FIG. 5; 699 in FIG. 6) or the set of hash functions (e.g., 506 in FIG. 5; 604 in FIG. 6). At 712, the graphics processor 702 may be configured to store (e.g., at 520 in FIG. 5; at 628 in FIG. 6) a bit location associated with the memory address bit for a set of memory address bits (e.g., k bits, mapping in FIG. 6) based on the memory address bit having the different highest number of value changes (e.g., 522, for 524 in FIG. 5; from 618, from 620, from 622 in FIG. 6). Accordingly, at 714, the graphics processor 702 may be configured to determine a first hash function (e.g., 502 in FIG. 5; 606 in FIG. 6), of a set of hash functions (e.g., 506 in FIG. 5; 604 in FIG. 6), having a first number of value changes (e.g., 522, for 524 in FIG. 5; from

618, from 620, from 622 in FIG. 6) over hashed memory address bits (e.g., 518 in FIG. 5; 612, 614, 616 in FIG. 6) across concurrent fibers (e.g., 514 in FIG. 5; 603 in FIG. 6) for a subgroup (e.g., 510, 512 in FIG. 5; 699 in FIG. 6) of a workgroup (e.g., 508 in FIG. 5), as noted above.

At 804, the apparatus may execute, in association with the memory bank, the selected hash function for a set of remaining instructions of the workgroup. For example, referring to FIG. 7, at 716, the graphics processor 702 may be configured to map (e.g., at 626 in FIG. 6), prior to execution of the first hash function (e.g., 502 in FIG. 5; 606 in FIG. 6) for the set of remaining instructions of the workgroup (e.g., 508 in FIG. 5), a set of memory address bits (e.g., k bits, mapping in FIG. 6) having an indication of a highest entropy (e.g., 522, for 524 in FIG. 5; from 618, from 620, from 622 in FIG. 6) to the memory bank (e.g., of the memory 704 (e.g., 599 in FIG. 5; 699 in FIG. 6)), where the set of memory address bits (e.g., k bits, mapping in FIG. 6) includes the memory address bit based on the memory address bit having the different highest number of value changes (e.g., 522, for 524 in FIG. 5; from 618, from 620, from 622 in FIG. 6). In aspects, the indication of the highest entropy (e.g., 522, for 524 in FIG. 5; from 618, from 620, from 622 in FIG. 6) may be associated with the highest number of value changes (e.g., bit flips) (e.g., 522, for 524 in FIG. 5; from 618, from 620, from 622 in FIG. 6) for the set of memory address bits (e.g., k bits, mapping in FIG. 6) across the concurrent fibers (e.g., 514 in FIG. 5; 603 in FIG. 6). At 718, the graphics processor 702 may be configured to execute (e.g., at 630 in FIG. 6), in association with the memory bank (e.g., of the memory 704 (e.g., 599 in FIG. 5; 699 in FIG. 6)), the first hash function (e.g., 502 in FIG. 5; 606 in FIG. 6) for a set of remaining instructions of the workgroup (e.g., 508 in FIG. 5). The graphics processor 702 may be configured to execute (e.g., at 630 in FIG. 6) the first hash function (e.g., 502 in FIG. 5; 606 in FIG. 6) in association with the memory address bit (e.g., determined at 710). The graphics processor 702 may be configured to execute (e.g., at 630 in FIG. 6) the first hash function (e.g., 502 in FIG. 5; 606 in FIG. 6) in association with the mapped (e.g., at 626 in FIG. 6) set of memory address bits (e.g., k bits, mapping in FIG. 6).

In aspects, the graphics processor 702 may be configured to output an indication (e.g., 632 in FIG. 6) of execution of the first hash function (e.g., 502 in FIG. 5; 606 in FIG. 6) for the set of remaining instructions of the workgroup (e.g., 508 in FIG. 5). In some aspects, to output the indication (e.g., 632 in FIG. 6) of the execution of the first hash function (e.g., 502 in FIG. 5; 606 in FIG. 6) for the set of remaining instructions of the workgroup (e.g., 508 in FIG. 5), the graphics processor 702 may be configured to transmit the indication (e.g., 632 in FIG. 6) of the execution of the first hash function (e.g., 502 in FIG. 5; 606 in FIG. 6) for the set of remaining instructions of the workgroup (e.g., 508 in FIG. 5). In some aspects, to output the indication (e.g., 632 in FIG. 6) of the execution of the first hash function (e.g., 502 in FIG. 5; 606 in FIG. 6) for the set of remaining instructions of the workgroup (e.g., 508 in FIG. 5), the graphics processor 702 may be configured to store the indication (e.g., 632 in FIG. 6) of the execution of the first hash function (e.g., 502 in FIG. 5; 606 in FIG. 6) for the set of remaining instructions of the workgroup (e.g., 508 in FIG. 5). The indication (e.g., 632 in FIG. 6) may be stored in a system memory, in the memory 704, and/or the like (e.g., 599 in FIG. 5; 699 in FIG. 6).

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may include means for determining a first hash function, of a set of hash functions, having a first number of value changes over hashed memory address bits across concurrent fibers for a subgroup of a workgroup, where the first number of value changes for the first hash function is a highest number of value changes compared to remaining hash functions in the set of hash functions during respective executions for the set of hash functions, where the hashed memory address bits are associated with accesses to a memory bank of a memory, and for executing, in association with the memory bank, the first hash function for a set of remaining instructions of the workgroup. The apparatus may further include means for executing, prior to determination of the first hash function and as the respective executions, each hash function of the set of hash functions for an initial instruction of the workgroup for a first access to the memory bank of the accesses to the memory bank, and for determining a respective number of value changes over the hashed memory address bits across the concurrent fibers for the subgroup, where the initial instruction includes the first access to the memory bank. The apparatus may further include means for determining, prior to determination of the first hash function, a memory address bit of the hashed memory address bits having a different highest number of value changes for the memory address bit across the concurrent fibers for the subgroup during the respective executions; where executing the first hash function includes executing the first hash function in association with the memory address bit. The apparatus may further include means for storing a bit location associated with the memory address bit for a set of memory address bits based on the memory address bit having the different highest number of value changes. The apparatus may further include means for mapping, prior to execution of the first hash function for the set of remaining instructions of the workgroup, a set of memory address bits having an indication of a highest entropy to the memory bank, where the set of memory address bits includes the memory address bit based on the memory address bit having the different highest number of value changes; where executing the first hash function includes executing the first hash function in association with the mapped set of memory address bits. The apparatus may further include means for determining, subsequent to determination of the first hash function and prior to the mapping of the set of memory address bits, a set of additional memory address bits of the hashed memory address bits having respective next highest numbers of value changes for memory address bits thereof across the concurrent fibers for the subgroup during execution of the first hash function for the initial instruction; where the set of memory address bits includes the set of additional memory address bits based on the set of additional memory address bits having the respective next highest numbers of value changes. The apparatus may further include means for outputting an indication of execution of the first hash function for the set of remaining instructions of the workgroup.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for." Unless stated otherwise, the phrase "a processor" may refer to "any of one or more processors" (e.g., one processor of one or more processors, a number (greater than one) of processors in the one or more processors, or all of the one or more processors) and the phrase "a memory" may refer to "any of one or more memories" (e.g., one memory of one or more memories, a number (greater than one) of memories in the one or more memories, or all of the one or more memories).

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may include RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of graphics processing, comprising: determining a first hash function, of a set of hash functions, having a first number of value changes over hashed memory address bits across concurrent fibers for a subgroup of a workgroup, wherein the first number of value changes for the first hash function is a highest number of value changes compared to remaining hash functions in the set of hash functions during respective executions for the set of hash functions, wherein the hashed memory address bits are associated with accesses to a memory bank of a memory; and executing, in association with the memory bank, the first hash function for a set of remaining instructions of the workgroup.

Aspect 2 is the method of aspect 1, further comprising: executing, prior to determination of the first hash function and as the respective executions, each hash function of the set of hash functions for an initial instruction of the workgroup for a first access to the memory bank of the accesses to the memory bank; and determining a respective number of value changes over the hashed memory address bits across the concurrent fibers for the subgroup, wherein the initial instruction includes the first access to the memory bank.

Aspect 3 is the method of aspect 2, further comprising: determining, prior to determination of the first hash function, a memory address bit of the hashed memory address bits having a different highest number of value changes for the memory address bit across the concurrent fibers for the subgroup during the respective executions; wherein executing the first hash function includes executing the first hash function in association with the memory address bit.

Aspect 4 is the method of aspect 3, further comprising: storing a bit location associated with the memory address bit for a set of memory address bits based on the memory address bit having the different highest number of value changes.

Aspect 5 is the method of aspect 3, further comprising: mapping, prior to execution of the first hash function for the set of remaining instructions of the workgroup, a set of memory address bits having an indication of a highest entropy to the memory bank, wherein the set of memory address bits includes the memory address bit based on the memory address bit having the different highest number of value changes; wherein executing the first hash function includes executing the first hash function in association with the mapped set of memory address bits.

Aspect 6 is the method of aspect 5, further comprising: determining, subsequent to determination of the first hash function and prior to the mapping of the set of memory address bits, a set of additional memory address bits of the hashed memory address bits having respective next highest numbers of value changes for memory address bits thereof across the concurrent fibers for the subgroup during execution of the first hash function for the initial instruction; wherein the set of memory address bits includes the set of additional memory address bits based on the set of additional memory address bits having the respective next highest numbers of value changes.

Aspect 7 is the method of aspect 6, wherein a number of memory address bits in the set of memory address bits is based on at least one of a size of the memory or the set of hash functions.

Aspect 8 is the method of aspect 5, wherein the indication of the highest entropy is associated with the highest number of value changes for the set of memory address bits across the concurrent fibers.

Aspect 9 is the method of any of aspects 1 to 8, wherein determining the first hash function comprises selecting the first hash function out of the set of hash functions based on the first number of value changes for the first hash function being the highest number of value changes compared to the remaining hash functions during the respective executions for the set of hash functions.

Aspect 10 is the method of any of aspects 1 to 9, wherein each hash function of the set of hash functions is an exclusive or (XOR)-based hash function.

Aspect 11 is the method of any of aspects 1 to 10, wherein the memory is a local memory in a graphics processing unit (GPU).

Aspect 12 is the method of any of aspects 1 to 11, further comprising: outputting an indication of execution of the first hash function for the set of remaining instructions of the workgroup.

Aspect 13 is the method of aspect 12, wherein outputting the indication of the execution of the first hash function for the set of remaining instructions of the workgroup comprises: transmitting the indication of the execution of the first hash function for the set of remaining instructions of the workgroup; or storing the indication of the execution of the first hash function for the set of remaining instructions of the workgroup.

Aspect 14 is an apparatus for graphics processing comprising a processor coupled to a memory and, based on information stored in the memory, the processor is configured to implement a method as in any of aspects 1-13.

Aspect 15 may be combined with aspect 14 and comprises that the apparatus is a wireless communication device.

Aspect 16 is an apparatus for graphics processing comprising means for implementing a method as in any of aspects 1-13.

Aspect 17 is a computer-readable medium (e.g., a non-transitory computer readable-medium) storing computer executable code, the computer executable code, when executed by a processor, causes the processor to implement a method as in any of aspects 1-13.

Various aspects have been described herein. These and other aspects are within the scope of the following claims.

What is claimed is:

1. An apparatus for graphics processing, comprising:
- a memory; and
- a processor coupled to the memory and, based on information stored in the memory, the processor is configured to:
  - determine a first hash function, of a set of hash functions, having a first number of value changes over hashed memory address bits across concurrent fibers for a subgroup of a workgroup, wherein the first number of value changes for the first hash function is a highest number of value changes compared to remaining hash functions in the set of hash functions during respective executions for the set of hash functions, wherein the hashed memory address bits are associated with accesses to a memory bank of the memory; and
  - execute, in association with the memory bank, the first hash function for a set of remaining instructions of the workgroup.

2. The apparatus of claim 1, wherein the processor is further configured to:
- execute, prior to determination of the first hash function and as the respective executions, each hash function of the set of hash functions for an initial instruction of the workgroup for a first access to the memory bank of the accesses to the memory bank; and
- determine a respective number of value changes over the hashed memory address bits across the concurrent fibers for the subgroup, wherein the initial instruction includes the first access to the memory bank.

3. The apparatus of claim 2, wherein the processor is further configured to:
- determine, prior to determination of the first hash function, a memory address bit of the hashed memory address bits having a different highest number of value changes for the memory address bit across the concurrent fibers for the subgroup during the respective executions;
- wherein to execute the first hash function, the processor is configured to execute the first hash function in association with the memory address bit.

4. The apparatus of claim 3, wherein the processor is further configured to:
- store a bit location associated with the memory address bit for a set of memory address bits based on the memory address bit having the different highest number of value changes.

5. The apparatus of claim 3, wherein the processor is further configured to:
- map, prior to execution of the first hash function for the set of remaining instructions of the workgroup, a set of memory address bits having an indication of a highest entropy to the memory bank, wherein the set of memory address bits includes the memory address bit based on the memory address bit having the different highest number of value changes;

wherein to execute the first hash function, the processor is configured to execute the first hash function in association with the mapped set of memory address bits.

6. The apparatus of claim 5, wherein the processor is further configured to:

determine, subsequent to determination of the first hash function and prior to the mapping of the set of memory address bits, a set of additional memory address bits of the hashed memory address bits having respective next highest numbers of value changes for memory address bits thereof across the concurrent fibers for the subgroup during execution of the first hash function for the initial instruction;

wherein the set of memory address bits includes the set of additional memory address bits based on the set of additional memory address bits having the respective next highest numbers of value changes.

7. The apparatus of claim 6, wherein a number of memory address bits in the set of memory address bits is based on at least one of a size of the memory or the set of hash functions.

8. The apparatus of claim 5, wherein the indication of the highest entropy is associated with the highest number of value changes for the set of memory address bits across the concurrent fibers.

9. The apparatus of claim 1, wherein to determine the first hash function, the processor is configured to select the first hash function out of the set of hash functions based on the first number of value changes for the first hash function being the highest number of value changes compared to the remaining hash functions during the respective executions for the set of hash functions.

10. The apparatus of claim 1, wherein each hash function of the set of hash functions is an exclusive or (XOR)-based hash function.

11. The apparatus of claim 1, wherein the memory includes a local memory in a graphics processing unit (GPU).

12. The apparatus of claim 1, further wherein the processor is further configured to:

output an indication of execution of the first hash function for the set of remaining instructions of the workgroup.

13. The apparatus of claim 12, wherein to output the indication of the execution of the first hash function for the set of remaining instructions of the workgroup, the processor is configured to at least one of:

transmit the indication of the execution of the first hash function for the set of remaining instructions of the workgroup; or store the indication of the execution of the first hash function for the set of remaining instructions of the workgroup.

14. The apparatus of claim 1, wherein the apparatus is a wireless communication device.

15. A method of graphics processing, comprising:

determining a first hash function, of a set of hash functions, having a first number of value changes over hashed memory address bits across concurrent fibers for a subgroup of a workgroup, wherein the first number of value changes for the first hash function is a highest number of value changes compared to remaining hash functions in the set of hash functions during respective executions for the set of hash functions, wherein the hashed memory address bits are associated with accesses to a memory bank of a memory; and executing, in association with the memory bank, the first hash function for a set of remaining instructions of the workgroup.

16. The method of claim 15, further comprising:

executing, prior to determination of the first hash function and as the respective executions, each hash function of the set of hash functions for an initial instruction of the workgroup for a first access to the memory bank of the accesses to the memory bank; and determining a respective number of value changes over the hashed memory address bits across the concurrent fibers for the subgroup, wherein the initial instruction includes the first access to the memory bank.

17. The method of claim 16, further comprising:

determining, prior to determination of the first hash function, a memory address bit of the hashed memory address bits having a different highest number of value changes for the memory address bit across the concurrent fibers for the subgroup during the respective executions;

storing a bit location associated with the memory address bit for a set of memory address bits based on the memory address bit having the different highest number of value changes; and mapping, prior to execution of the first hash function for the set of remaining instructions of the workgroup, the set of memory address bits having an indication of a highest entropy to the memory bank, wherein the set of memory address bits includes the memory address bit based on the memory address bit having the different highest number of value changes;

wherein executing the first hash function includes executing the first hash function in association with the memory address bit and the mapped set of memory address bits.

18. The method of claim 17, further comprising:

determining, subsequent to determination of the first hash function and prior to the mapping of the set of memory address bits, a set of additional memory address bits of the hashed memory address bits having respective next highest numbers of value changes for memory address bits thereof across the concurrent fibers for the subgroup during execution of the first hash function for the initial instruction;

wherein the set of memory address bits includes the set of additional memory address bits based on the set of additional memory address bits having the respective next highest numbers of value changes.

19. The method of claim 15, wherein determining the first hash function comprises selecting the first hash function out of the set of hash functions based on the first number of value changes for the first hash function being the highest number of value changes compared to the remaining hash functions during the respective executions for the set of hash functions;

wherein each hash function of the set of hash functions is an exclusive or (XOR)-based hash function; or wherein the memory is a local memory in a graphics processing unit (GPU).

20. A non-transitory computer-readable medium storing computer executable code, the computer executable code, when executed by a processor, causes the processor to:

determine a first hash function, of a set of hash functions, having a first number of value changes over hashed memory address bits across concurrent fibers for a subgroup of a workgroup, wherein the first number of value changes for the first hash function is a highest number of value changes compared to remaining hash functions in the set of hash functions during respective executions for the set of hash functions, wherein the hashed memory address bits are associated with accesses to a memory bank of a memory; and execute, in association with the memory bank, the first hash function for a set of remaining instructions of the workgroup.

* * * * *